US009913055B2

United States Patent
Wu et al.

(10) Patent No.: US 9,913,055 B2
(45) Date of Patent: Mar. 6, 2018

(54) PLAYBACK REQUEST PROCESSING METHOD AND APPARATUS

(71) Applicant: TENCENT TECHNOLOGY (SHENZHEN) COMPANY LIMITED, Shenzhen (CN)

(72) Inventors: Xiayu Wu, Shenzhen (CN); Rong Wan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/214,101

(22) Filed: Jul. 19, 2016

(65) Prior Publication Data

US 2016/0330558 A1 Nov. 10, 2016

Related U.S. Application Data

(63) Continuation of application No. PCT/CN2015/071332, filed on Jan. 22, 2015.

(30) Foreign Application Priority Data

Jan. 23, 2014 (CN) .......................... 2014 1 0033709

(51) Int. Cl.
*A63F 13/54* (2014.01)
*H04R 29/00* (2006.01)
(Continued)

(52) U.S. Cl.
CPC ........... *H04R 29/001* (2013.01); *G06F 3/165* (2013.01); *H04W 4/025* (2013.01);
(Continued)

(58) Field of Classification Search
CPC ...... H04R 29/001; G06F 3/165; H04W 4/025; H04W 64/006; H04M 1/72558; A63F 13/54
See application file for complete search history.

(56) References Cited

U.S. PATENT DOCUMENTS 5,926,400 A * 7/1999 Kytle ...................... G06F 3/011
  381/18
6,572,475 B1 * 6/2003 Okabe ..................... A63F 13/10
  463/30

(Continued)

FOREIGN PATENT DOCUMENTS

CN 202691658 U 1/2013
CN 103187080 A 7/2013
(Continued)

OTHER PUBLICATIONS

The World Intellectual Property Organization (WIPO) International Search Report for PCT/CN2015/071332 Apr. 29, 2015 p. 1-3.

*Primary Examiner* — Sonia Gay
(74) *Attorney, Agent, or Firm* — Anova Law Group, PLLC

(57) ABSTRACT

A playback request processing method and apparatus belongs to the field of computer technologies. The method includes: receiving a playback request sent by a sound source; determining whether a sound diffusion range of the sound source is within a current receiving range of a recipient; and processing the playback request if the sound diffusion range of the sound source is within the current receiving range of the recipient. In the present disclosure, it is determined according to the received playback request sent by the sound source that the sound diffusion range of the sound source is within the current receiving range of the (Continued)

recipient, and whether to process the playback request sent by the sound source is determined according to a determination result.

14 Claims, 5 Drawing Sheets

(51) Int. Cl.
*H04W 64/00* (2009.01)
*H04W 4/02* (2009.01)
*G06F 3/16* (2006.01)
*H04M 1/725* (2006.01)

(52) U.S. Cl.
CPC ........... *H04W 64/006* (2013.01); *A63F 13/54* (2014.09); *H04M 1/72558* (2013.01)

(56) References Cited

U.S. PATENT DOCUMENTS

| | | | | |
|---|---|---|---|---|
| 8,189,813 | B2* | 5/2012 | Muraoka | A63F 13/10 381/104 |
| 2007/0274528 | A1 | 11/2007 | Nakamoto et al. | |
| 2007/0293313 | A1* | 12/2007 | Shimizu | A63F 13/10 463/31 |
| 2012/0315988 | A1* | 12/2012 | Tsuchida | H04S 3/002 463/35 |

FOREIGN PATENT DOCUMENTS

| | | |
|---|---|---|
| DE | 3638480 C2 | 4/1994 |
| DE | 19720243 A1 | 11/1998 |
| JP | 2011033560 A | 2/2011 |

* cited by examiner

4(a)  4(b)

5(a)  5(b)

PLAYBACK REQUEST PROCESSING METHOD AND APPARATUS

CROSS-REFERENCES TO RELATED APPLICATIONS

This application is a continuation application of PCT Patent Application No. PCT/CN2015/071332, filed on Jan. 22, 2015, which claims priority to Chinese Patent Application No. 201410033709.1, filed on Jan. 23, 2014, the entire contents of both of which are incorporated herein by reference.

FIELD OF THE TECHNOLOGY

The present disclosure relates to the field of computer technologies, and in particular, to a playback request processing method and apparatus.

BACKGROUND OF THE DISCLOSURE

A three-dimensional graphics engine is an algorithm implementation set by using which a representation form such as a polygon or a curve is abstracted from a real substance, related computation is performed in a computer, and a final image is output. By using the three-dimensional graphics engine, scenario creation, object processing, scenario rendering, event processing, and the like can be performed. A playback request needs to be sent for each sound playback activity triggered in a scenario of the three-dimensional graphics engine, and a sound is played after the playback request is processed.

In a related technology, during playback request processing, a playback request sent by a sound source is first received, and the received playback request is then processed, so as to control the sound source, which sends the playback request, to play a sound. For example, if playback requests sent by a sound source A and a sound source B are received, the playback requests sent by the sound source A and the sound source B are processed, so as to control the sound source A and the sound source B to play sounds; or if playback requests sent by a sound source A, a sound source B, and a sound source C are received, the playback requests sent by the sound source A, the sound source B, and the sound source C are processed, so as to control the sound source A, the sound source B, and the sound source C to play sounds.

In the related technology, because a received playback request is processed during playback request processing, that is, each received playback request is processed once the playback request sent by a sound source is received, when a sound to be played by the sound source that sends the playback request cannot be received by a recipient, the playback request sent by the sound source is still processed in the related technology to control the sound source to play the sound, which results in relatively low resource utilization.

SUMMARY

Embodiments of the present invention provide a playback request processing method and apparatus. The technical solutions are as follows:

According to one aspect of the present disclosure, a playback request processing method is provided, applied to a client device having one or more processors and a memory for storing instructions executed by the one or more processors. The playback request may include: receiving a playback request sent by a sound source; determining whether a sound diffusion range of the sound source is within a current receiving range of a recipient; and processing the playback request if the sound diffusion range of the sound source is within the current receiving range of the recipient.

According to another aspect of the present disclosure, a playback request processing apparatus is provided, and includes: one or more processors; and a memory, where one or more program modules are stored in the memory and executed by the one or more processors, and the one or more program modules include: a receiving module, configured to receive a playback request sent by a sound source; a first determining module, configured to determine whether a sound diffusion range of the sound source is within a current receiving range of a recipient; and a processing module, configured to: when the sound diffusion range of the sound source is within the current receiving range of the recipient, process the playback request.

Beneficial effects of the technical solutions provided in the embodiments of the present invention are as follows.

It is determined according to a received playback request sent by a sound source that a sound diffusion range of the sound source is within a current receiving range of a recipient, and whether to process the playback request sent by the sound source is determined according to a determination result. Therefore, compared with that all received playback requests are processed, a problem of low resource utilization caused by the fact that the sound source is still controlled to play a sound when the sound diffusion range of the sound source is not within the current receiving range of the recipient is avoided, thereby improving resource utilization.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present disclosure more comprehensible, the following further describes the embodiments of the present invention in detail with reference to the accompanying drawings.

Embodiment 1

Figure 1:
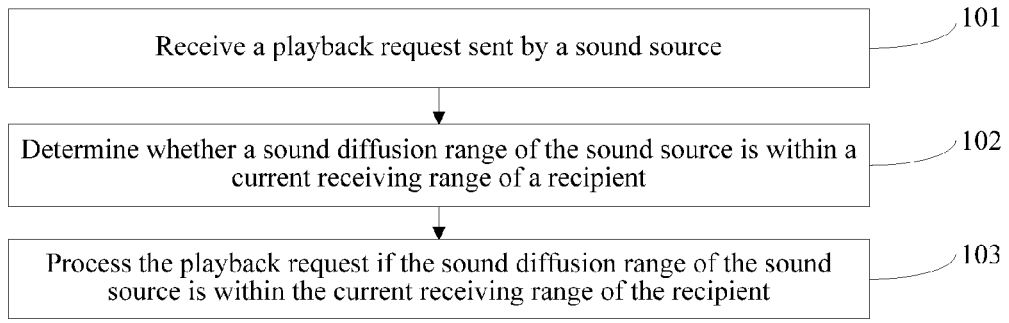
FIG. 1 is a flowchart of a playback request processing method according to Embodiment 1 of the present invention.

This embodiment of the present invention provides a playback request processing method. Referring to FIG. 1, a procedure of the method provided in this embodiment may include the following steps.

101: Receiving a playback request sent by a sound source.

102: Determining whether a sound diffusion range of the sound source is within a current receiving range of a recipient.

103: Processing the playback request if the sound diffusion range of the sound source is within the current receiving range of the recipient.

As a preferred embodiment, the determining whether a sound diffusion range of the sound source is within a current receiving range of a recipient includes: determining whether the sound diffusion range of the sound source overlaps with the current receiving range of the recipient; and determining, if the sound diffusion range of the sound source overlaps with the current receiving range of the recipient, that the sound diffusion range of the sound source is within the current receiving range of the recipient.

As a preferred embodiment, after the determining whether a sound diffusion range of the sound source is within a current receiving range of a recipient, the method further includes: shielding the playback request if the sound diffusion range of the sound source is not within the current receiving range of the recipient.

As a preferred embodiment, before the determining whether a sound diffusion range of the sound source is within a current receiving range of a recipient, the method further includes: acquiring the current receiving range of the recipient.

As a preferred embodiment, after the processing the playback request, the method further includes: acquiring a moving speed of the recipient in real time; and updating the current receiving range of the recipient according to the moving speed of the recipient.

As a preferred embodiment, after the processing the playback request, the method further includes: determining whether the sound diffusion range of the sound source is within an updated receiving range of the recipient; and controlling, if the sound diffusion range of the sound source is not within the updated receiving range of the recipient, the sound source to stop playing a sound.

As a preferred embodiment, after the playback request is shielded, the method further includes: determining whether the sound diffusion range of the sound source is within an updated receiving range of the recipient; and controlling, if the sound diffusion range of the sound source is within the updated receiving range of the recipient, the sound source to play a sound.

In the method provided in this embodiment of the present invention, it is determined according to a received playback request sent by a sound source that a sound diffusion range of the sound source is within a current receiving range of a recipient, and whether to process the playback request sent by the sound source is determined according to a determination result. Therefore, compared with that all received playback requests are processed, a problem of low resource utilization caused by the fact that the sound source is still controlled to play a sound when the sound diffusion range of the sound source is not within the current receiving range of the recipient is avoided, thereby improving resource utilization.

Embodiment 2

Figure 2:
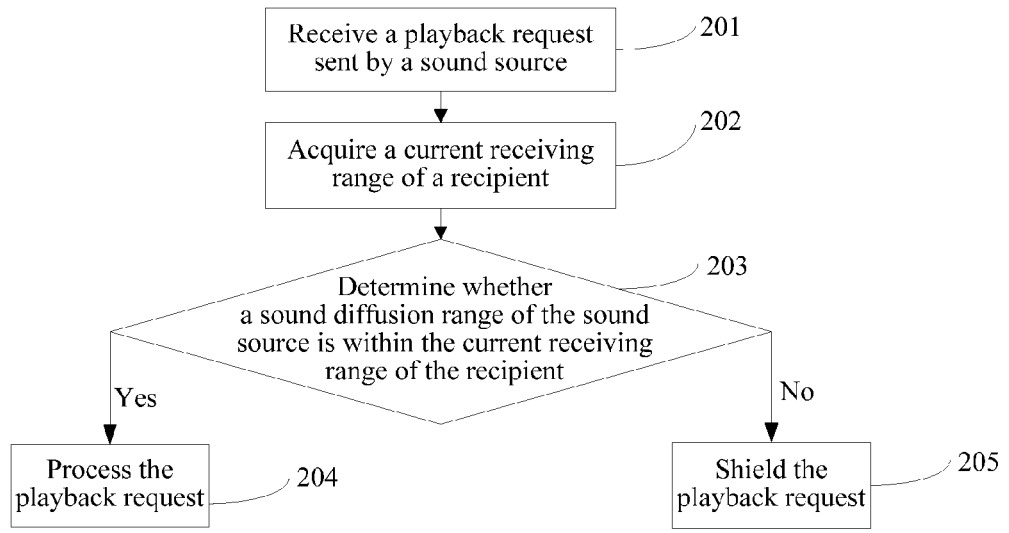
FIG. 2 is a flowchart of a playback request processing method according to Embodiment 2 of the present invention.

With the development of science and technologies, each playback activity triggered in a three-dimensional graphics engine is implemented by processing a playback request. In an existing playback request processing method, all received playback requests sent by a sound source are processed, which results in relatively low resource utilization. Therefore, this embodiment of the present invention provides a playback request processing method. Now with reference to content of Embodiment 1, the playback request processing method provided in this embodiment of the present invention is described in detail. Referring to FIG. 2, a procedure of the method provided in this embodiment may include the following steps

201: Receiving a playback request sent by a sound source.

In a scenario, the sound source is triggered to play a sound; the sound source sends the playback request to a sound control apparatus such as acoustic equipment; and after receiving the playback request sent by the sound source, the sound control apparatus needs to determine, in subsequent steps, whether to process the playback request sent by the sound source.

Further, in a scenario, if there may be one or more sound sources triggered to play a sound, consequently, when one sound source is triggered to play a sound, a playback request sent by the one sound source is received; and when multiple sound sources are triggered to play a sound, playback requests sent by the multiple sound sources are received. The number of received playback requests sent by the sound source is not specifically limited in this embodiment.

A manner of receiving the playback request sent by the sound source includes, but is not limited to: receiving the playback request sent by the sound source by means of a message, a notification, or the like. Content of the playback request sent by the sound source includes, but is not limited to, an identifier of the sound source, a sound diffusion range of the sound source, and the like; and the content of the playback request sent by the sound source is not specifically limited in this embodiment.

202: Acquiring a current receiving range of a recipient.

The current receiving range of the recipient is a range within which the recipient can currently receive a sound. Specifically, the current receiving range of the recipient may be 10 meters, 20 meters, 30 meters, or the like; and the current receiving range of the recipient is not specifically limited in this embodiment. Because the current receiving range of the recipient is an important basis for determining whether to process the playback request sent by the sound source, in order to determine, in subsequent steps, whether to process the playback request sent by the sound source, the current receiving range of the recipient needs to be first acquired in the method provided in this embodiment.

A manner of acquiring the current receiving range of the recipient is not specifically limited in this embodiment, and includes, but is not limited to, the following manner: first, acquiring a moving speed of the recipient; then, determining a moving distance, within a current preset time period, of the recipient according to the acquired moving speed of the recipient; and then, using, as the current receiving range of the recipient, a range of a circle having the circle center being the recipient and the radius being the moving distance, within the current preset time period, of the recipient.

A device for acquiring the moving speed of the recipient is not specifically limited in this embodiment, and includes, but is not limited to, a speed measurement device used for acquisition. The current preset time period may be 1 second, 2 seconds, 3 seconds, or the like; and the current preset time period is not specifically limited in this embodiment.

203: Determining whether a sound diffusion range of the sound source is within the current receiving range of the recipient; if yes, performing step 204; and if not, performing step 205.

The sound diffusion range of the sound source is a diffusion range of a sound emitted by the sound source, that is, a range of a circle having the center being the sound source and the radius being a sound diffusion distance of the sound source. The sound diffusion range of the sound source may be 100 square meters, 200 square meters, 300 square meters, or the like; and a value of the sound diffusion range of the sound source is not specifically limited in this embodiment. The sound diffusion distance of the sound source may be 10 meters, 20 meters, 30 meters, or the like; and the sound diffusion distance of the sound source is also not specifically limited in this embodiment.

A manner of acquiring the sound diffusion range of the sound source includes, but is not limited to: acquiring the sound diffusion range of the sound source from the playback request sent by the sound source. Specifically, the sound diffusion range of the sound source may be acquired from the playback request sent by the sound source in the following two manners.

First manner: If the playback request sent by the sound source carries the sound diffusion range of the sound source, the sound diffusion range of the sound source may be directly acquired from the playback request sent by the sound source.

Second manner: If the playback request sent by the sound source carries the identifier of the sound source, the sound diffusion range of the sound source may be acquired according to the identifier of the sound source.

In the second manner, because the playback request sent by the sound source carries the identifier of the sound source, and the identifier of the sound source pre-stores a sound source type corresponding to the sound source, the sound diffusion range of the sound source, and the like, the sound diffusion range of the sound source can be acquired by querying the identifier of the sound source.

Further, the recipient can hear, within the sound diffusion range of the sound source, a sound played by the sound source, and cannot hear, beyond the sound diffusion range of the sound source, a sound played by the sound source; and a sound received by the recipient is a sound within the current receiving range; therefore, to improve resource utilization and ensure that a sound played according to a processed playback request is effectively played, that is, a sound played by the sound source can be received by the recipient, in the method provided in this embodiment, before whether to process the playback request sent by the sound source is determined, whether the sound diffusion range of the sound source is within the current receiving range of the recipient needs to be determined first.

Specifically, the determining whether a sound diffusion range of the sound source is within the current receiving range of the recipient includes, but is not limited to: determining whether the sound diffusion range of the sound source overlaps with the current receiving range of the recipient; and determining, if the sound diffusion range of the sound source overlaps with the current receiving range of the recipient, that the sound diffusion range of the sound source is within the current receiving range of the recipient.

For ease of understanding of the foregoing process, a specific example is used for detailed description in the following.

Figure 3:
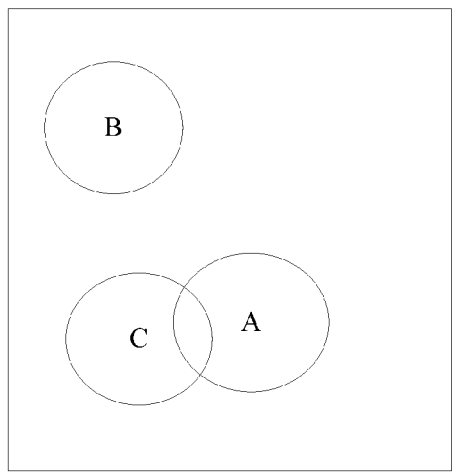
FIG. 3 is a schematic diagram of a first location relationship between a sound diffusion range of a sound source and a current receiving range of a recipient according to Embodiment 3 of the present invention.

As shown in FIG. 3, a circle A is the current receiving range of the recipient, a circle B is a sound diffusion range of a sound source 1, and a circle C is a sound diffusion range of a sound source 2. As can be known from FIG. 3, the circle A does not overlap with the circle B, which indicates that the sound diffusion range of the sound source 1 does not overlap with the current receiving range of the recipient; therefore, it is determined that the sound diffusion range of the sound source 1 is not within the current receiving range of the recipient; and the circle A overlaps with the circle C, which indicates that the sound diffusion range of the sound source 2 overlaps with the current receiving range of the recipient; therefore, it is determined that the sound diffusion range of the sound source 2 is within the current receiving range of the recipient.

204: Processing the playback request, and the procedure ends.

Because it is already determined in step 203 that the sound diffusion range of the sound source is within the current receiving range of the recipient, which indicates that a sound played by the sound source can be received by the recipient, based on step 203, the playback request sent by the sound source is processed in this step.

Further, after the playback request is processed, to ensure that the sound source can play a sound, in the method provided in this embodiment, a playback instruction is further returned to the sound source, so that after receiving the playback instruction, the sound source plays a sound according to the received playback instruction.

Further, because the current receiving range of the recipient is determined according to the moving speed of the recipient, when the moving speed of the recipient changes, a value of the current receiving range of the recipient also changes. Besides, after the moving speed of the recipient changes, relative locations of the sound source and the recipient change. A change of the value of the current receiving range of the recipient and changes of the relative locations of the sound source and the recipient result in a change of an overlapping relationship between the sound diffusion range of the sound source and the current receiving range of the recipient. Therefore, to improve resource utilization and ensure that a sound played by the sound source is effectively played, in the method provided in this embodiment, the moving speed of the recipient is further acquired in real time, and the current receiving range of the recipient is updated according to the moving speed of the recipient.

Specifically, because both the change of the value of the current receiving range of the recipient and the changes of the relative locations of the sound source and the recipient result in a change of the current receiving range of the recipient, updating the current receiving range of the recipient according to the moving speed of the recipient includes, but is not limited to, the following two cases.

First case: The current receiving range of the recipient is updated according to the change of the value of the current receiving range of the recipient and the change of the relative location of the sound source and the recipient.

In the first case, as the moving speed of the recipient changes, a location, relative to the sound source, of the recipient changes, and the value of the current receiving range of the recipient also changes. Specifically, as the moving speed of the recipient changes, a change relationship of the location, relative to the sound source, of the recipient is as follows: when the moving speed of the recipient becomes higher, the relative locations of the recipient and the sound source become nearer, and in this case, the sound diffusion range of the sound source and the current receiving range of the recipient relatively become wider; and when the moving speed of the recipient becomes lower, the relative locations of the recipient and the sound source become farther, and in this case, the sound diffusion range of the sound source and the current receiving range of the recipient relatively become narrower. Specifically, as the moving speed of the recipient changes, the value of the current receiving range of the recipient may be classified into the following two cases.

1) If the acquired moving speed of the recipient becomes higher, the value of the current receiving range of the recipient is increased, and a value of the current receiving range of the recipient obtained after the increase is used as an updated value of the current receiving range of the recipient.

For example, if the moving speed of the recipient acquired last time is 3 meters per second, and the moving speed of the recipient acquired currently is 5 meters per second, because the moving speed of the recipient becomes higher, the value of the current receiving range of the recipient is increased according to the moving speed of the recipient.

2) If the acquired moving speed of the recipient becomes lower, the value of the current receiving range of the recipient is used as an updated value of the current receiving range of the recipient.

For example, if the moving speed of the recipient acquired last time is 6 meters per second, and the moving speed of the recipient acquired currently is 5 meters per second, because the moving speed of the recipient becomes lower, the value of the current receiving range of the recipient is used as the updated value of the current receiving range of the recipient.

Second case: The value of the current receiving range of the recipient remains unchanged, and a location of the current receiving range of the recipient is updated according to a change of a location, relative to the sound source, of the recipient, so as to obtain an updated current receiving range of the recipient.

In the second case, when the moving speed of the recipient changes, the relative locations of the recipient and the sound source change; and as the relative locations of the recipient and the sound source change, the overlapping relationship between the sound diffusion range of the sound source and the current receiving range of the recipient changes. Therefore, when the value of the current receiving range of the recipient remains unchanged, the location of the current receiving range of the recipient may be updated according to changes of locations of the recipient and the sound source, so as to obtain the updated current receiving range of the recipient.

Further, to ensure that the sound source whose sound diffusion range is within the current receiving range of the recipient plays a sound in real time, in the method provided in this embodiment, after the current receiving range of the recipient is updated according to the moving speed of the recipient, whether the sound diffusion range of the sound source whose playback request has been processed is within the updated receiving range of the recipient is further determined; and if the sound diffusion range of the sound source whose playback request has been processed is not within the updated receiving range of the recipient, the sound source is controlled to stop playing a sound.

For ease of understanding of the foregoing process, a specific example is used for detailed description in the following.

Figure 4:
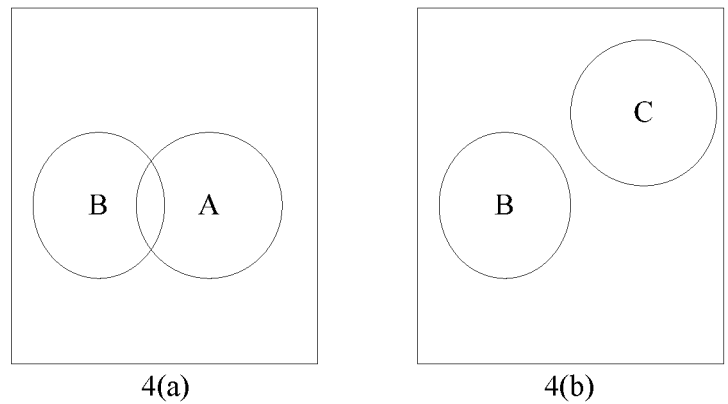
FIG. 4 is a schematic diagram of a second location relationship between a sound diffusion range of a sound source and a current receiving range of a recipient according to Embodiment 3 of the present invention.

As shown in FIG. 4, FIG. 4 (a) is a schematic diagram of a location relationship between the sound diffusion range of the sound source and the current receiving range of the recipient, and FIG. 4 (b) is a schematic diagram of a location relationship between the sound diffusion range of the sound source and the updated current receiving range of the recipient. A circle A is the current receiving range of the recipient, a circle B is the sound diffusion range of the sound source, and a circle C is the updated current receiving range of the recipient. As can be known from FIG. 4 (a), the circle A overlaps with the circle B, which indicates that the sound diffusion range of the sound source is within the current receiving range of the recipient, and in this case, the playback request sent by the sound source is processed and the sound source is controlled to play a sound. As can be known from FIG. 4 (b), the circle C does not overlap with the circle B, which indicates that the sound diffusion range of the sound source is not within the updated current receiving range of the recipient, and in this case, the sound source is controlled to stop playing a sound.

205: Shielding the playback request.

Because it is already determined in step 203 that the sound diffusion range of the sound source is not within the receiving range of the recipient, which indicates that a sound played by the sound source cannot be received by the recipient, based on step 203, the playback request sent by the sound source is shielded or blocked in this step. Shielding the playback request refers to controlling the sound source not to play a sound. A shielding manner is not limited in this embodiment, and includes, but is not limited to: omitting the playback request and the like.

Further, after the playback request is shielded, in order to ensure that the sound source whose playback request is shielded cannot play a sound, in the method provided in this embodiment, a playback prohibition instruction is further returned to the sound source, so that after receiving the playback prohibition instruction, the sound source stops playing a sound according to the received playback prohibition instruction.

Further, because the current receiving range of the recipient is determined according to the moving speed of the recipient, when the moving speed of the recipient changes, the current receiving range of the recipient also changes. Besides, after the moving speed of the recipient changes, a location relationship between the sound source and the recipient changes. A change of the current receiving range of the recipient and a change of the location relationship between the sound source and the recipient result in a change of an overlapping relationship between the sound diffusion range of the sound source and the current receiving range of the recipient. Therefore, to improve resource utilization and ensure that a sound played by the sound source is effectively played, in the method provided in this embodiment, the moving speed of the recipient is further acquired in real time, and the current receiving range of the recipient is updated according to the moving speed of the recipient.

Specifically, for a method for updating the current receiving range of the recipient according to the moving speed of the recipient, specifically refer to step 204; and no further details are provided herein again.

Further, to ensure that the sound source whose sound diffusion range is within the current receiving range of the recipient plays a sound in real time, in the method provided in this embodiment, after the current receiving range of the recipient is updated according to the moving speed of the recipient, whether the sound diffusion range of the sound source whose playback request has been shielded is within an updated receiving range of the recipient is further determined; and if the sound diffusion range of the sound source whose playback request has been shielded is within the updated receiving range of the recipient, the sound source is controlled to play a sound.

For ease of understanding of the foregoing process, a specific example is used for detailed explanation and description in the following.

Figure 5:
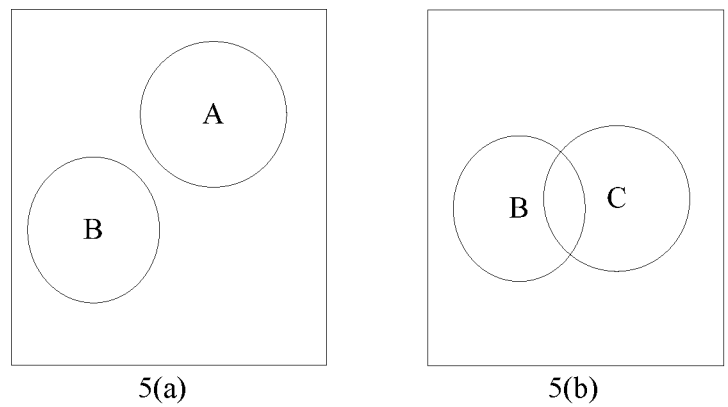
FIG. 5 is a schematic diagram of a third location relationship between a sound diffusion range of a sound source and a current receiving range of a recipient according to Embodiment 3 of the present invention.

As shown in FIG. 5, FIG. 5 (*a*) is a schematic diagram of a location relationship between the sound diffusion range of the sound source and the current receiving range of the recipient, and FIG. 5 (*b*) is a schematic diagram of a location relationship between the sound diffusion range of the sound source and an updated current receiving range of the recipient. A circle A is the current receiving range of the recipient, a circle B is the sound diffusion range of the sound source, and a circle C is the updated current receiving range of the recipient. As can be known from FIG. 5 (*a*), the circle A does not overlap with the circle B, which indicates that the sound diffusion range of the sound source is not within the current receiving range of the recipient, and in this case, the playback request sent by the sound source is not processed, and the sound source is controlled to stop playing a sound. As can be known from FIG. 5 (*b*), the circle C overlaps with the circle B, which indicates that the sound diffusion range of the sound source is within the updated current receiving range of the recipient, and in this case, the sound source is controlled to play a sound.

In the method provided in this embodiment of the present invention, it is determined according to a received playback request sent by a sound source that a sound diffusion range of the sound source is within a current receiving range of a recipient, and whether to process the playback request sent by the sound source is determined according to a determination result. Therefore, compared with that all received playback requests are processed, a problem of low resource utilization caused by the fact that the sound source is still controlled to play a sound when the sound diffusion range of the sound source is not within the current receiving range of the recipient is avoided, thereby improving resource utilization.

Embodiment 3

Figure 6:
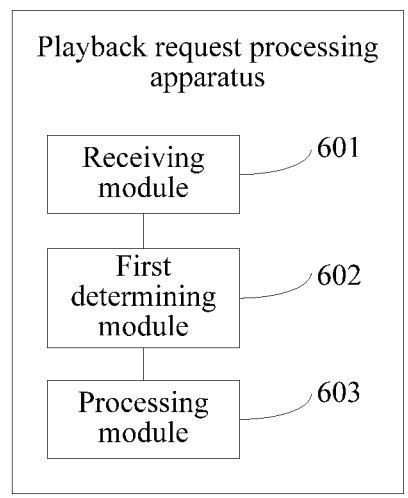
FIG. 6 is a schematic structural diagram of a first playback request processing apparatus according to Embodiment 4 of the present invention.

Referring to FIG. 6, this embodiment of the present invention provides a playback request processing apparatus, and the apparatus includes: a receiving module 601, configured to receive a playback request sent by a sound source; a first determining module 602, configured to determine whether a sound diffusion range of the sound source is within a current receiving range of a recipient; and a processing module 603, configured to: when the sound diffusion range of the sound source is within the current receiving range of the recipient, process the playback request.

As a preferred embodiment, the first determining module 602 is configured to determine whether the sound diffusion range of the sound source overlaps with the current receiving range of the recipient, and when the sound diffusion range of the sound source overlaps with the current receiving range of the recipient, determine that the sound diffusion range of the sound source is within the current receiving range of the recipient.

As a preferred embodiment, the processing module 603 is further configured to: when the sound diffusion range of the sound source is not within the current receiving range of the recipient, shield the playback request.

Figure 7:
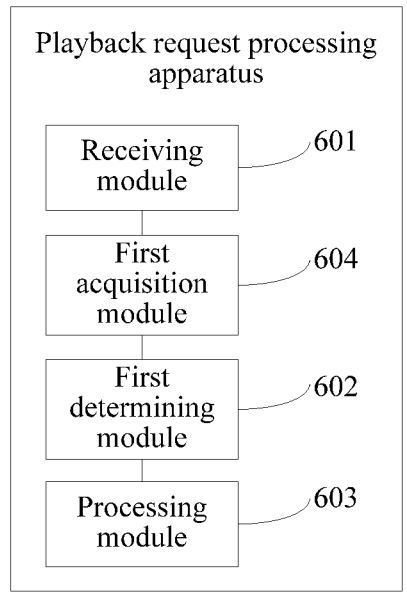
FIG. 7 is a schematic structural diagram of a second playback request processing apparatus according to Embodiment 4 of the present invention.

Referring to FIG. 7, the apparatus further includes: a first acquisition module 604, configured to acquire the current receiving range of the recipient.

Figure 8:
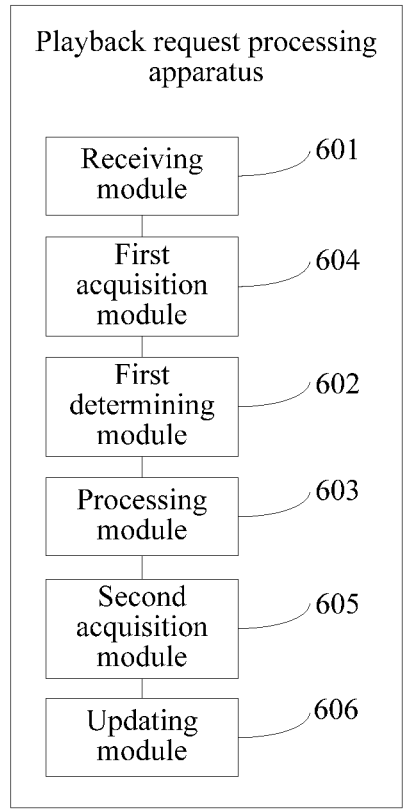
FIG. 8 is a schematic structural diagram of a third playback request processing apparatus according to Embodiment 4 of the present invention.

Referring to FIG. 8, the apparatus further includes: a second acquisition module 605, configured to acquire a moving speed of the recipient in real time; and an updating module 606, configured to update the current receiving range of the recipient according to the moving speed of the recipient.

Figure 9:
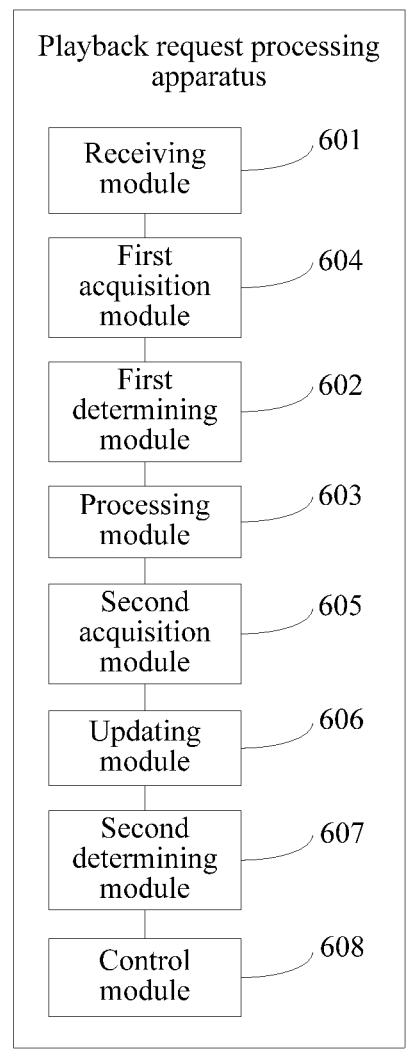
FIG. 9 is a schematic structural diagram of a fourth playback request processing apparatus according to Embodiment 4 of the present invention.

Referring to FIG. 9, the apparatus further includes: a second determining module 607, configured to determine whether the sound diffusion range of the sound source is within an updated receiving range of the recipient; and a control module 608, configured to: when the sound diffusion range of the sound source is not within the updated receiving range of the recipient, control the sound source to stop playing a sound.

As a preferred embodiment, the second determining module 607 is configured to determine whether the sound diffusion range of the sound source is within an updated receiving range of the recipient; and the control module 608 is further configured to: when the sound diffusion range of the sound source is within the updated receiving range of the recipient, control the sound source to play a sound.

In conclusion, the apparatus provided in this embodiment of the present invention determines according to a received playback request sent by a sound source that a sound diffusion range of the sound source is within a current receiving range of a recipient, and determines, according to a determination result, whether to process the playback request sent by the sound source. Therefore, compared with that all received playback requests are processed, a problem of low resource utilization caused by the fact that the sound source is still controlled to play a sound when the sound diffusion range of the sound source is not within the current receiving range of the recipient is avoided, thereby improving resource utilization.

Embodiment 4

Figure 10:
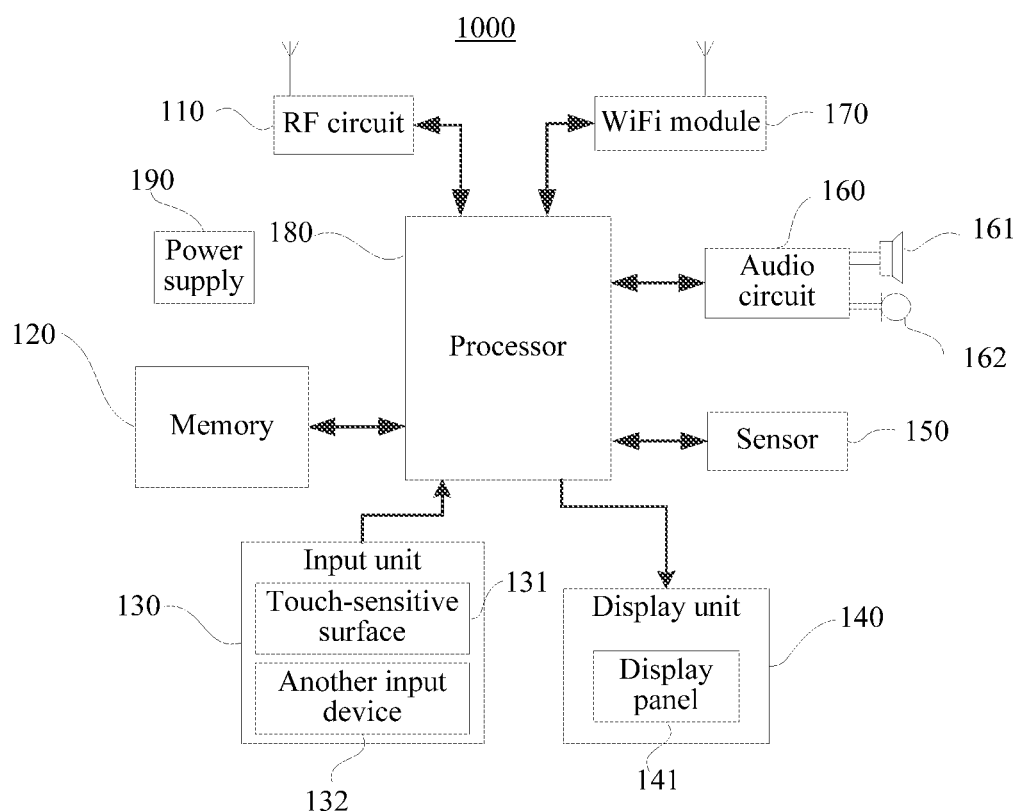
FIG. 10 is a schematic structural diagram of a terminal according to Embodiment 5 of the present invention.

Refer to FIG. 10, which is a schematic structural diagram of a terminal involved in this embodiment of the present invention. The terminal may be configured to implement the playback request processing methods provided in the foregoing embodiments.

Specifically, the terminal 1000 may include components such as a radio frequency (RF) circuit 110, a memory 120 including one or more computer readable storage media, an input unit 130, a display unit 140, a sensor 150, an audio circuit 160, a Wireless Fidelity (WiFi) module 170, a processor 180 including one or more processing cores, and a power supply 190. A person skilled in the art may understand that the structure of the terminal shown in FIG. 10 does not constitute a limitation to the terminal, and the terminal may include more components or fewer components than those shown in the figure, or some components may be combined, or a different component deployment may be used.

The RF circuit 110 may be configured to receive and send a signal during an information receiving and sending process or a conversation process; and specifically receive downlink information from a base station, then deliver the downlink information to one or more processors 180 for processing, and send related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), a duplexer, and the like. In addition, the RF circuit 110 may also communicate with a network and another device by wireless communication. The wireless communication may use any communications standard or protocol, which includes, but is not limited to, Global System for Mobile Communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 1000, and the like. In addition, the memory 120 may include a high speed random access memory, and may also include a non-volatile memory, such as at least one magnetic disk storage device, a flash memory, or another volatile solid storage device. Accordingly, the memory 120 may further include a memory controller, so that the processor 180 and the input unit 130 access the memory 120.

The input unit 130 may be configured to receive input digit or character information, and generate keyboard, mouse, joystick, optical, or track ball signal input related to the user setting and function control. Specifically, the input unit 130 may include a touch-sensitive surface 131 and another input device 132. The touch-sensitive surface 131 may also be referred to as a touch screen or a touch panel, and may collect a touch operation of a user on or near the touch-sensitive surface (such as an operation of a user on or near the touch-sensitive surface 131 by using any suitable object or attachment, such as a finger or a touch pen), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be implemented by using various types, such as a resistive type, a capacitance type, an infrared type, and a surface sound wave type. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, a joystick, and the like.

The display unit 140 may be configured to display information input by the user or information provided for the user, and various graphical user interfaces of various figures of the terminal. The graphical user interfaces may be formed by a graph, a text, an icon, a video, and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine a type of a touch event. Then, the processor 180 provides corresponding visual output on the display panel 141 according to the type of the touch event. Although, in FIG. 10, the touch-sensitive surface 131 and the display panel 141 are used as two separate parts to implement input and output functions, in some embodiments, the touch-sensitive surface 131 and the display panel 141 may be integrated to implement the input and output functions.

The terminal 1000 may further include at least one sensor 150, for example, a light sensor, a motion sensor, or another sensor. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 1000 is moved to the ear. As one type of motion sensor, a gravity acceleration sensor may detect magnitude of accelerations at various directions (which generally are triaxial), may detect magnitude and a direction of the gravity when static, and may be configured to identify an application of a mobile phone gesture (such as switchover between horizontal and vertical screens, a related game, and gesture calibration of a magnetometer), a related function of vibration identification (such as a pedometer and a knock). Other sensors, such as a gyroscope, a barometer, a hygrometer, a thermometer, and an infrared sensor, which may be configured in the terminal 1000 are not further described herein.

The audio circuit 160, a loudspeaker 161, and a microphone 162 may provide audio interfaces between the user and the terminal 1000. The audio circuit 160 may transmit, to the loudspeaker 161, a received electric signal converted from received audio data. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the terminal 1000.

WiFi belongs to a short distance wireless transmission technology. The terminal 1000 may help, by using the WiFi module 170, a user to receive and send an e-mail, browse a webpage, and access stream media, and the like, which provides wireless broadband Internet access for the user. Although FIG. 10 shows the WiFi module 170, it may be understood that, the WiFi module does not belong to a necessary constitution of the terminal, and can be ignored according to demands without changing the scope of the essence of the present invention.

The processor 180 is a control center of the terminal 1000, and connects to various parts of a mobile phone by using various interfaces and lines. By running or executing the software program and/or module stored in the memory 120, and invoking data stored in the memory 120, the processor 180 performs various functions and data processing of the memory 120 of the terminal, thereby performing overall monitoring on the mobile phone. Optionally, the processor 180 may include one or more processing cores. Preferably, the processor 180 may integrate an application processor and a modem. The application processor mainly processes an operating system, a user interface, an application program, and the like. The modem mainly processes wireless communication. It may be understood that, the foregoing modem may also not be integrated into the processor 180.

The terminal 1000 further includes the power supply 190 (such as a battery) for supplying power to the components. Preferably, the power supply may logically connect to the processor 180 by using a power supply management system, thereby implementing functions, such as charging, discharging, and power consumption management, by using the power supply management system. The power supply 190 may further include any component, such as one or more direct current or alternate current power supplies, a recharging system, a power supply fault detection circuit, a power supply converter or an inverter, and a power supply state indicator.

Although not shown in the figure, the terminal 1000 may further include a camera, a Bluetooth module, and the like, which are not further described herein. Specifically, in this embodiment, the display unit of the terminal 1000 may be a touch screen display, and the terminal 1000 further includes a memory and one or more programs. The one or more programs are stored in the memory and configured to be executed by one or more processors. The one or more programs contain instructions used for implementing the following operations: receiving a playback request sent by a sound source; determining whether a sound diffusion range of the sound source is within a current receiving range of a recipient; and processing the playback request if the sound diffusion range of the sound source is within the current receiving range of the recipient.

The programs for implementing the disclosed method may be incorporated in a three-dimensional graphics engine for processing events and rendering scenarios. The three-dimensional graphics engine may be applied in any scenario related to a 3D virtual environment creation and processing. The three-dimensional graphics engine may be a program running locally on the terminal, remotely on a server, or cooperatively by both the user terminal and the server through a communication network. The terminal 1000 may implement the user terminal and the server. For example, the three-dimensional graphics engine may be configured to support a shooting game application. When a user is playing a character in the shooting game on a user terminal, the disclosed method may be applied to provide sound information according to the position of the character (e.g., sound of an approaching enemy, sound of an object relatively moving away from the character).

Assuming that the foregoing is a first possible implementation manner, in a second possible implementation manner provided based on the first possible implementation manner, the memory of the terminal further includes an instruction for performing the following operations. The determining whether a sound diffusion range of the sound source is within a current receiving range of a recipient includes: determining whether the sound diffusion range of the sound source overlaps with the current receiving range of the recipient; and determining, if the sound diffusion range of the sound source overlaps with the current receiving range of the recipient, that the sound diffusion range of the sound source is within the current receiving range of the recipient.

In a third possible implementation manner provided based on the first possible implementation manner or the second possible implementation manner, the memory of the terminal further includes an instruction for performing the following operations. After the determining whether a sound diffusion range of the sound source is within a current receiving range of a recipient, the method further includes: shielding the playback request if the sound diffusion range of the sound source is not within the current receiving range of the recipient.

In a fourth possible implementation manner provided based on the first to third possible implementation manners, the memory of the terminal further includes an instruction for performing the following operations. Before the determining whether a sound diffusion range of the sound source is within a current receiving range of a recipient, the method further includes: acquiring the current receiving range of the recipient.

In a fifth possible implementation manner provided based on the first to fourth possible implementation manners, the memory of the terminal further includes an instruction for performing the following operations. After the processing the playback request, the method further includes: acquiring a moving speed of the recipient in real time; and updating the current receiving range of the recipient according to the moving speed of the recipient.

In a sixth possible implementation manner provided based on the first to fifth possible implementation manners, the memory of the terminal further includes an instruction for performing the following operations.

After the playback request is shielded, the method further includes: determining whether the sound diffusion range of the sound source is within an updated receiving range of the recipient; and controlling, if the sound diffusion range of the sound source is within the updated receiving range of the recipient, the sound source to play a sound.

The terminal provided in this embodiment of the present invention determines according to a received playback request sent by a sound source that a sound diffusion range of the sound source is within a current receiving range of a recipient, and determines, according to a determination result, whether to process the playback request sent by the sound source. Therefore, compared with that all received playback requests are processed, a problem of low resource utilization caused by the fact that the sound source is still controlled to play a sound when the sound diffusion range of the sound source is not within the current receiving range of the recipient is avoided, thereby improving resource utilization.

Embodiment 5

This embodiment of the present invention further includes a computer readable storage medium. The computer readable storage medium may be the computer readable storage medium included in the memory in the foregoing embodiment, and may also be a computer readable storage medium that exists independently and is not disposed into a terminal. The computer readable storage medium stores one or more programs, and the one or more programs are used by one or more processors to execute a playback request processing method. The method includes: receiving a playback request sent by a sound source; determining whether a sound diffusion range of the sound source is within a current receiving range of a recipient; and processing the playback request if the sound diffusion range of the sound source is within the current receiving range of the recipient.

Assuming that the foregoing is a first possible implementation manner, in a second possible implementation manner provided based on the first possible implementation manner, the computer readable storage medium further includes an instruction for performing the following operations. The determining whether a sound diffusion range of the sound source is within a current receiving range of a recipient includes: determining whether the sound diffusion range of the sound source overlaps with the current receiving range of the recipient; and determining, if the sound diffusion range of the sound source overlaps with the current receiving range of the recipient, that the sound diffusion range of the sound source is within the current receiving range of the recipient.

In a third possible implementation manner provided based on the first possible implementation manner or the second possible implementation manner, the computer readable storage medium further includes an instruction for performing the following operations. After the determining whether a sound diffusion range of the sound source is within a current receiving range of a recipient, the method further includes: shielding the playback request if the sound diffusion range of the sound source is not within the current receiving range of the recipient.

In a fourth possible implementation manner provided based on the first to third possible implementation manners, the computer readable storage medium further includes an instruction for performing the following operations. Before the determining whether a sound diffusion range of the sound source is within a current receiving range of a recipient, the method further includes: acquiring the current receiving range of the recipient.

In a fifth possible implementation manner provided based on the first to fourth possible implementation manners, the computer readable storage medium further includes an instruction for performing the following operations. After the processing the playback request, the method further includes: acquiring a moving speed of the recipient in real time; and updating the current receiving range of the recipient according to the moving speed of the recipient.

In a sixth possible implementation manner provided based on the first to fifth possible implementation manners, the computer readable storage medium further includes an instruction for performing the following operations.

After the playback request is shielded, the method further includes: determining whether the sound diffusion range of the sound source is within an updated receiving range of the recipient; and controlling, if the sound diffusion range of the sound source is within the updated receiving range of the recipient, the sound source to play a sound.

The computer readable storage medium provided in this embodiment of the present invention determines according to a received playback request sent by a sound source that a sound diffusion range of the sound source is within a current receiving range of a recipient, and determines, according to a determination result, whether to process the playback request sent by the sound source. Therefore, compared with that all received playback requests are processed, a problem of low resource utilization caused by the fact that the sound source is still controlled to play a sound when the sound diffusion range of the sound source is not within the current receiving range of the recipient is avoided, thereby improving resource utilization.

It should be noted that, in the playback request processing apparatus provided in the foregoing embodiments, during processing of a playback request, divisions of the foregoing functional modules are merely used as an example for description. In an actual application, the foregoing functions may be allocated, as needed, to different functional modules for implementation. That is, the internal structure of the playback request processing apparatus is divided into different functional modules, so as to perform all or a part of the functions described above. In addition, the playback request processing apparatus provided in the foregoing embodiments and the playback request processing methods provided in the foregoing embodiments belong to a same idea. For a specific implementation process thereof, refer to the method embodiments, and no further details are provided herein again.

The sequence numbers of the foregoing embodiments of the present invention are merely for the convenience of description, and do not imply the preference among the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing embodiments are merely preferred embodiments of the present invention, and are not intended to limit the present disclosure. Any modification, equivalent replacement, improvement, and the like made without departing from the spirit and principle of the present disclosure shall fall within the protection scope of the present disclosure.

What is claimed is:

1. A playback request processing method, applied to a client device having one or more processors and a memory for storing instructions executed by the one or more processors, the method comprising:
   receiving a playback request sent by a sound source;
   determining whether a sound diffusion range of the sound source is within a current receiving range of a recipient; and
   processing the playback request if the sound diffusion range of the sound source is within the current receiving range of the recipient,
   wherein the sound diffusion range of the sound source is a range of a circle with a center being the sound source and a radius being a sound diffusion distance of the sound source,
   when the received playback request sent by the sound source carries the sound diffusion range of the sound source, the sound diffusion range of the sound source is acquired from the received playback request sent by the sound source; and
   when the received playback request sent by the sound source carries an identifier of the sound source that pre-stores the sound diffusion range of the sound source, the sound diffusion range is acquired by querying the identifier of the sound source.

2. The method according to claim 1, the determining whether a sound diffusion range of the sound source is within a current receiving range of a recipient comprises:
   determining whether the sound diffusion range of the sound source overlaps with the current receiving range of the recipient; and
   determining, if the sound diffusion range of the sound source overlaps with the current receiving range of the recipient, that the sound diffusion range of the sound source is within the current receiving range of the recipient.

3. The method according to claim 1, after the determining whether a sound diffusion range of the sound source is within a current receiving range of a recipient, further comprising:

shielding the playback request if the sound diffusion range of the sound source is not within the current receiving range of the recipient.

4. The method according to claim 1, before the determining whether a sound diffusion range of the sound source is within a current receiving range of a recipient, further comprising:

acquiring the current receiving range of the recipient.

5. The method according to claim 1, after the processing the playback request, further comprising:

acquiring a moving speed of the recipient in real time; and
updating the current receiving range of the recipient according to the moving speed of the recipient.

6. The method according to claim 5, after the processing the playback request, further comprising:

determining whether the sound diffusion range of the sound source is within an updated receiving range of the recipient; and
controlling, if the sound diffusion range of the sound source is not within the updated receiving range of the recipient, the sound source to stop playing a sound.

7. The method according to claim 3, after the shielding the playback request, the method further comprising:

determining whether the sound diffusion range of the sound source is within an updated receiving range of the recipient; and
controlling, if the sound diffusion range of the sound source is within the updated receiving range of the recipient, the sound source to play a sound.

8. A playback request processing apparatus, comprising:
one or more processors; and
a memory,
wherein one or more program modules are stored in the memory and executed by the one or more processors, and the one or more program modules comprise:
a receiving module, configured to receive a playback request sent by a sound source;
a first determining module, configured to determine whether a sound diffusion range of the sound source is within a current receiving range of a recipient; and
a processing module, configured to: when the sound diffusion range of the sound source is within the current receiving range of the recipient, process the playback request, wherein the sound diffusion range of the sound source is a range of a circle with a center being the sound source and a radius being a sound diffusion distance of the sound source,
when the received playback request sent by the sound source carries the sound diffusion range of the sound source, the sound diffusion range of the sound source is acquired from the received playback request sent by the sound source, and
when the received playback request sent by the sound source carries an identifier of the sound source that pre-stores the sound diffusion range of the sound source, the sound diffusion range is acquired by querying the identifier of the sound source.

9. The apparatus according to claim 8, wherein the first determining module is configured to determine whether the sound diffusion range of the sound source overlaps with the current receiving range of the recipient, and when the sound diffusion range of the sound source overlaps with the current receiving range of the recipient, determine that the sound diffusion range of the sound source is within the current receiving range of the recipient.

10. The apparatus according to claim 8, wherein the processing module is further configured to: when the sound diffusion range of the sound source is not within the current receiving range of the recipient, shield the playback request.

11. The apparatus according to claim 8, wherein the apparatus further comprises:

a first acquisition module, configured to acquire the current receiving range of the recipient.

12. The apparatus according to claim 8, wherein the apparatus further comprises:

a second acquisition module, configured to acquire a moving speed of the recipient in real time; and
an updating module, configured to update the current receiving range of the recipient according to the moving speed of the recipient.

13. The apparatus according to claim 12, wherein the apparatus further comprises:

a second determining module, configured to determine whether the sound diffusion range of the sound source is within an updated receiving range of the recipient; and
a control module, configured to: when the sound diffusion range of the sound source is not within the updated receiving range of the recipient, control the sound source to stop playing a sound.

14. The apparatus according to claim 13, wherein:
the control module is further configured to: when the sound diffusion range of the sound source is within the updated receiving range of the recipient, control the sound source to play a sound.

* * * * *